Figure 1:
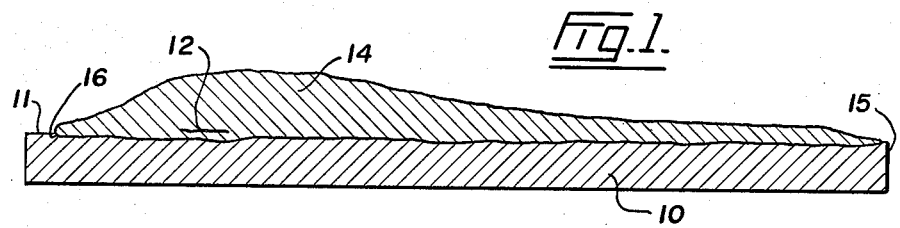

United States Patent [19] [11] 3,973,074
de Lissa et al. [45] Aug. 3, 1976

[54] FLAME-PROOF CELLULOSIC PRODUCT

[75] Inventors: Richard C.F. de Lissa, White Rock; Walter G. Schwarze, Burnaby, both of Canada

[73] Assignee: MacMillan Bloedel Limited, Vancouver, Canada

[22] Filed: Mar. 19, 1975

[21] Appl. No.: 559,767

Related U.S. Application Data

[63] Continuation of Ser. No. 334,105, Feb. 20, 1973, abandoned, which is a continuation-in-part of Ser. No. 146,089, May 24, 1971, abandoned.

[52] U.S. Cl. ............................. 428/537; 21/7; 106/15 FP; 252/8.1; 260/DIG. 24; 428/921
[51] Int. Cl.² .................. B32B 21/00; B32B 21/04
[58] Field of Search .......... 428/537, 541, 921, 920; 252/8.1; 21/7, 58; 106/15 FP; 260/DIG. 24, 24, 17.3

[56] References Cited
UNITED STATES PATENTS

| | | | |
|---|---|---|---|
| 433,215 | 7/1890 | Rabinowicz | 106/15 FP |
| 642,826 | 2/1900 | Robinson | 427/113 |
| 671,548 | 4/1901 | Gordon | 252/8.1 |
| 1,087,111 | 2/1914 | Engelson et al. | 106/15 FP |
| 1,645,173 | 10/1927 | Winogradoff | 252/8.1 |
| 2,106,938 | 2/1938 | Tramm et al. | 260/DIG. 24 |
| 2,667,425 | 1/1954 | Bierly | 106/15 FP |
| 2,718,479 | 9/1955 | Bierly | 428/921 X |
| 2,728,680 | 12/1955 | Duane | 252/8.1 X |
| 2,912,393 | 11/1959 | Stilbert, Jr. et al. | 428/314 X |
| 2,966,428 | 12/1960 | Singleton et al. | 106/178 |

*Primary Examiner*—Marion E. McCamish
*Assistant Examiner*—Henry F. Epstein
*Attorney, Agent, or Firm*—Fetherstonhaugh and Company

[57] ABSTRACT

A flame-proof product comprising a cellulosic base, and particularly a wood based product having at least one surface treated with a composition which when the surface is subjected to fire or high temperatures combines with some of the material of the base to form a protective intumescent coating on the surface which insulates the remainder of the product from thermal destruction. The treating composition includes potassium hydroxide and/or potassium carbonate alone or mixed with a comparatively small amount of sodium hydroxide and/or sodium carbonate. The composition may in addition include potassium chloride, or potassium acetate, or potassium citrate, or potassium bicarbonate, or potassium bisulfite, or potassium metaphosphate, or potassium nitrite, or potassium sulfide, or potassium sulfite, or potassium thiosulfate, or potassium phosphate (tribasic).

3 Claims, 5 Drawing Figures

FLAME-PROOF CELLULOSIC PRODUCT

This is a continuation of copending application Ser. No. 334,105, filed Feb. 20, 1973, now abandoned, which is, in turn, a continuation-in-part of earlier copending application Ser. No. 146,089, filed May 24, 1971, now abandoned.

This invention relates to a flame-proof cellulosic product and to methods of flame-proofing cellulosic products.

Any cellulosic base may be used for this product or for flame proofing treatment provided it has a reasonable thickness. The invention is particularly applicable to any wood based material, such as boards, plywood, particle boards, flake boards, and composition boards. For the sake of convenience, the invention will be described in connection with a particle board base made up of wood particles and a suitable glue or adhesive. Such boards are well known on the market and do not need any detailed description herein. The invention relates basically to a wood based substrate which has at least one surface treated by a chemical which, when said base is subjected to flame or high temperature, foams with the char formed by the action of the high temperature on the cellulose to form a protective intumescent layer, coating or covering over the surface, which insulates the remainder of the substrate from the flame or high temperature. The intumescent layer is formed extremely quickly so that the material of the substrate is affected by the temperature only to a very slight depth, and yet the intumescent layer, which is cellular, is relatively thick or deep.

According to the invention, the cellulosic substrate is treated with potassium hydroxide and/or potassium carbonate. Sodium, which is relatively inexpensive, can be mixed with the potassium as an extender, however, too much sodium cannot be used since it tends to reduce the beneficial effects of the potassium. Combinations of these metals may be used in accordance with the degree of fire proofing required, the cost that the resulting product can stand, and/or the intended use for the product.

The following chemicals can be used in the production of this flame-proofed product:

Potassium hydroxide with or without some sodium hydroxide; and/or potassium carbonate with or without some sodium carbonate; or potassium hydroxide with or without sodium hydroxide combined with one or more of the following: potassium carbonate, sodium carbonate, potassium chloride, sodium chloride, potassium thiosulphate, sodium thiosulphate, potassium bicarbonate, sodium bicarbonate, tripotassium phosphate, trisodium phosphate, potassium sulphide, sodium sulphide, potassium sulphite, sodium sulphite, potassium bisulphite, sodium bisulphite, potassium nitrite, sodium nitrite, potassium metaphosphate, sodium metaphosphate, potassium citrate, sodium citrate, potassium acetate, or sodium acetate. The selected composition or compositions is or are applied to cellulosic materials, and this alters the decomposition of cellulose under high temperatures in such a way that a protective relatively noncombustible intumescent carboniferous char layer is formed. This provides insulation from thermal destruction for the bulk of the substrate. The efficiency of this char formation depends on the chemicals used and their effect on the thermal decomposition of cellulose as discussed later.

The potassium hydroxide and carbonate chemicals produce the most desirable change in the mechanism of thermal decomposition allowing char formation.

The intumescent matrix formed on the surface of the substrate may be further described as follows:

It is a carboniferous char of thermally expanded and cross-linked molecules, the bulk of which are of cellulosic origin. The matrix so formed consists of unitized vapor pockets which are capable of trapping the evolved combustion gases from the cellulose, for example water and carbon dioxide, as well as the inorganic noncombustible vapors originating with the treatment chemicals, for example, carbon dioxide, from the high temperature decomposition of the carbonate portions of the treatment. Such a matrix system composed of a relatively noncombustible support and the so entrapped vapors provides sufficient thermal insulation to the cellulosic substrate as to render it flame resistant.

The chief criteria and mechanism for effective protective char formation is that the initial carbonization vitrification temperature has to be lower than the major depolymerization breakdown temperature in order to utilize water vapour from the controlled combustion reaction as one of the major blowing agents in cellulation of the vitrifying carbon being formed. This can be illustrated by thermogravimetric analysis which indicates the superiority of potassium treatment over sodium treatment in lowering the initial decomposition temperature of the cellulosic material.

In accordance with the invention the level of treatment of the cellulosic or wood based material with either the potassium carbonate or the potassium hydroxide alone or with any of the aforementioned compounds has no strict limitation. The limitations imposed are dependent on the degree of flame resistance desired and the requirements of the physical properties of the cellulosic or wood based material treated.

A flame-proofing composition according to this invention is composed of any one of the following:

1. An aqueous solution of potassium carbonate, or
2. An aqueous solution of potassium hydroxide, or
3. An aqueous solution of a mixture of potassium carbonate and potassium hydroxide, or
4. An aqueous solution of a mixture of potassium hydroxide alone or with a comparatively small amount of sodium hydroxide and potassium acetate or sodium acetate or potassium bicarbonate or sodium bicarbonate or potassium carbonate or sodium carbonate or potassium chloride or sodium chloride or potassium citrate or sodium citrate or potassium metaphosphate or sodium metaphosphate or potassium nitrite or sodium nitrite or potassium sulphide or sodium sulphide or potassium sulphite or sodium sulphite or tripotassium phosphate or trisodium phosphate or potassium thiosulphate or sodium thiosulphate, or potassium bisulphite or sodium bisulphite, or
5. An aqueous solution of any of the above in which other components, the effects of which are additive to the effects of the potassium hydroxide or the potassium carbonate or the potassium carbonate or potassium hydroxide and any of the aforementioned salts, account for not more than 25% of the total chemical constitution of the solution.

It is preferred to use the potassium compounds without the sodium compounds. However, in order to keep the cost down, a relatively small percentage of the sodium compounds can be used while keeping the fire retardant qualities of the composition at a good level. The sodium compounds should not be more than 25% of the total chemicals of the solution. In addition, the total amount of the chemicals should be at least about 5% by weight of the solution.

Cellulosic or wood based material treated with this composition, when subjected to fire or heat at about 180°C or above, decomposes in such a way as to form an intumescent char before the major thermal breakdown of the untreated portion of the substrate. This intumescent char thereby prevents extensive pyrolysis and combustion of the untreated cellulosic substrate and subsequently provides exceptional flame spread resistance.

An important advantage of the invention is the inherent ability of the treatment solution to penetrate the surface of the cellulosic or wood based material. It is found that absorption of the fire retardant into celulosic based materials is promoted by the alkalinity of the fire retardant with a preferred solution pH of 9 or 10 or greater giving maximum penetration. Such an ability allows intimate contact of the fire retardant chemicals with the cellulosic portion of the substrate and subsequently more efficient formation of the protective intumescent foam.

Additional advantages are, the variety of methods available for application, ease of application, and the economy of application of the fire retardant composition to the cellulosic or wood based material. If the cellulosic material is of composite construction, for example, a particle board material, the fire retardant solution may be applied by a spray process to the total furnish from which the particle board is formed or to the surface portion of said furnish. When it is necessary to treat a finished product, the fire retardant solution may be applied by pressurized treatments which are generally associated with the application of inorganic fire retardant chemicals or by a much more economical dipping or spraying process which utilizes the penetrating ability of the fire retardant solution.

The following examples illustrate the invention but are not to be considered as limiting in any way. In particular considerable variations may be made in the proportion of fire proofing substances applied and in the concentrations in which they are applied.

Figure 2:
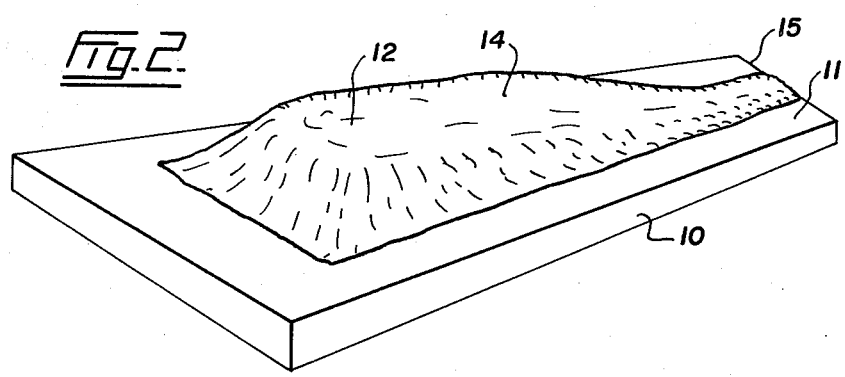
Figure 3:
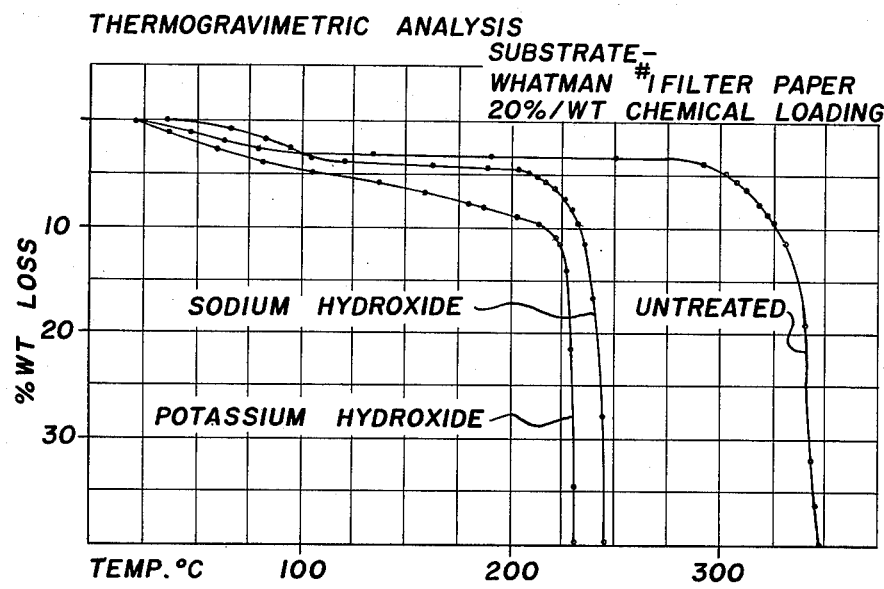
Figure 4:
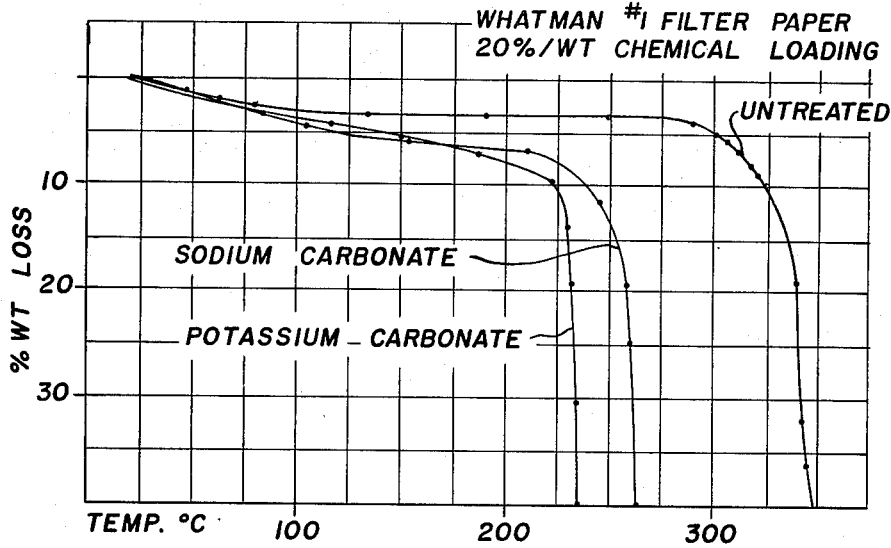
Figure 5:
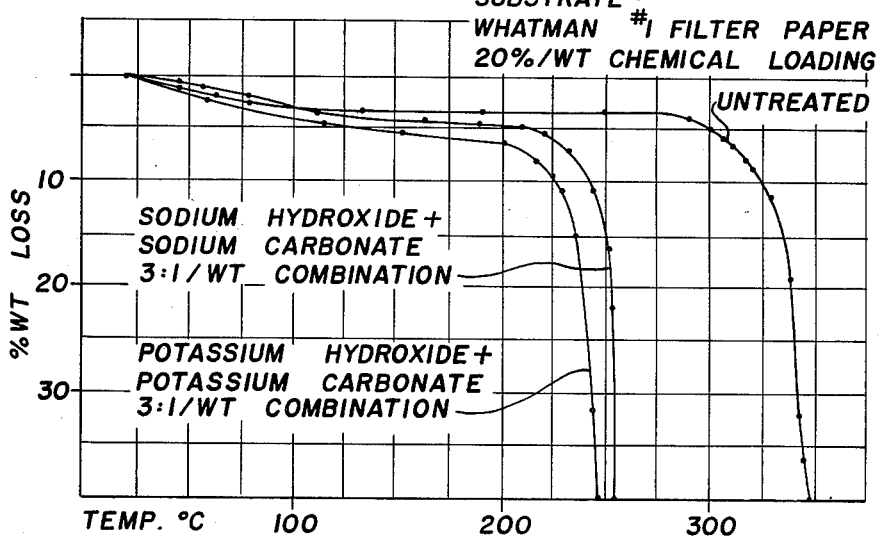

An example of a composition board flame-proofed in accordance with the above, and after being subjected to a flame, (in the Monsanto version of the 2-foot tunnel apparatus which has been correlated with the A.S.T.M.-E84 25-foot tunnel apparatus for measuring surface flame spread ratings) is diagrammatically illustrated in the accompanying drawings in which, FIG. 1 is a section through the board drawn substantially to scale, FIG. 2 is an isometric view of the board showing the surface thereof against which a flame was directed and indicating the results, and FIGS. 3, 4 and 5 are graphs illustrating the results of three different thermogravimetric tests.

Referring to FIGS. 1 and 2 of the drawings, 10 is a particle board having surface 11 which has been treated with the flame-proofing solution of this invention and against which at 12 the flame of a Meker type burner was directed. Almost instanteously the chemically treated wood particle surface charred and foamed forming an intumescent cover or layer 14. This layer swelled up as indicated and spread and preceded the flame front which during the test was caused to move towards the end of the board 15 due to the angle of inclination of the board and the induced air draft. The formation of the intumescent layer retards the spread of the flame along the board surface and also protects the substrate beneath it. The depth of this carboniferous intumescent layer varies with the temperature to which the board is exposed and the duration of this exposure. For example, as indicated in the drawings it is thickest, and hence provides the greatest protection to the wood surface, in the area 12 which was subjected directly to the Meker burner flame.

The depth of the wood affected by the flame and involved in the chemical action is indicated at 16. This is very shallow as compared to the thickness of the board. The layer 14 is of cellular construction and becomes relatively hard. This acts as an insulation barrier that protects the remainder of the board under the layer from the heat.

Each of FIGS. 3, 4 and 5 graphically illustrates the results of thermogravimetric analysis of three pieces of filter paper, one untreated and the other two soaked in different flameproofing chemicals. Each treated paper was dipped in the indicated chemical, dried and then a small strip thereof subjected to the thermogravimetric analysis. This analysis consists of measuring the weight loss of the sample as the temperature thereof is increased in a furnace. Each graph shows the initial decomposition temperature of the specimens under test. It is desirable to have the treated surface of a substrate start to decompose as soon as possible when exposed to high temperatures in order to start the formation of the intumescent coating which protects the remainder of the substrate. These graphs show that potassium hydroxide and potassium carbonate are the best chemicals for this purpose.

The following Examples show the improved flame spread ratings when the solutions of this invention are used:

EXAMPLE I

Hand felted particle boards bonded with ureaformaldehyde resin were prepared in the laboratory. The surface material was treated with KOH and some with $K_2CO_3$ before the board preparation. The following flame spread ratings (FSR) were obtained on the Monsanto version of the 2-foot tunnel test (H. L. Vandersall, "The Use of a Small Flame Tunnel for Evaluating Fire Hazards", *Journal of Paint Technology*, Vol. 39, No. 51, 494–500 (1967)) which has been correlated with the ASTM-E 84 25-foot tunnel test. A lower number indicates a better rating than a higher number. The chemical loading was based on the weight of chemical added to each surface divided by the total board weight.

|   |   | % Treatment | FSR |
|---|---|---|---|
|   | Control board | 0 | >140 |
| (a) | KOH treatment |   |   |
|   | 1. | 6.6 | 68 |
|   | 2. | 8.75 | 36 |
| (b) | $K_2CO_3$ treatment |   |   |
|   | 1. | 4.8 | 32 |
|   | 2. | 10 | 5 |
|   | 3. | 10 | 8 |

EXAMPLE II

Particle board and Douglas fir plywood samples were treated by a dipping process with an aqueous solution containing KOH and $K_2CO_3$. After drying to 4–5% moisture content and after being conditioned at 70°F and 50% relative humidity for a period of three weeks the following flame spread ratings were obtained in the 2 foot tunnel test. The chemical loading is expressed both as the weight (lb) of chemical added to 1 square foot of one board surface, the units therefore being lb chemical/square foot/side and the weight of chemical added to the board sample divided by the total board weight expressed as percent. The solution composition is defined as the weight of chemical divided by the total weight of solution expressed as percent.

| Sample | Solution Composition % KOH | % $K_2CO_3$ | Chemical Retention lb/sq.ft/side | % of Board | FSR |
|---|---|---|---|---|---|
| Particle board | | | | | |
| 1 | 0 | 0 | 0 | 0 | >140 |
| 2 | 41 | 0 | 0.021 | 9.1 | 18 |
| 3 | 27 | 17 | 0.115 | 8.2 | 24 |
| 4 | 20 | 24 | 0.114 | 8.2 | 32 |
| 5 | 13 | 33 | 0.123 | 9.6 | 53 |
| 6 | 10 | 37 | 0.104 | 7.8 | 67 |
| 7 | 3 | 43 | 0.109 | 8.4 | 90 |
| 8 | 0 | 43 | 0.096 | 7.3 | 92 |
| Plywood | | | | | |
| 1 | 0 | 0 | 0 | 0 | 130 |
| 2 | 25 | 18 | 0.078 | 7.8 | 7 |
| 3 | 25 | 18 | 0.080 | 8.0 | 12 |

EXAMPLE III

Particle board samples were treated by a dipping process with an aqueous solution containing KOH and NaOH. Drying, conditioning, testing and amount of total chemical retained was determined as in Example II.

| Sample | Solution Composition % KOH | % NaOH | Chemical Retention lb/sq.ft/side | % of board | FSR |
|---|---|---|---|---|---|
| 1 | 0 | 0 | 0 | 0 | >140 |
| 2 | 42 | 0 | 0.044 | 3.7 | 5 |
| 3 | 38 | 4 | 0.046 | 3.8 | 12 |
| 4 | 37 | 5 | 0.046 | 3.8 | 14 |
| 5 | 36 | 6 | 0.045 | 3.7 | 16 |
| 6 | 35 | 7 | 0.046 | 3.9 | 18 |
| 7 | 33 | 8 | 0.046 | 3.8 | 20 |
| 8 | 31 | 10 | 0.043 | 3.6 | 24 |
| 9 | 27 | 14 | 0.043 | 3.4 | 28 |
| 10 | 20 | 20 | 0.046 | 3.7 | 58 |
| 11 | 14 | 27 | 0.045 | 3.7 | 73 |
| 12 | 10 | 31 | 0.044 | 3.7 | 77 |
| 13 | 8 | 33 | 0.046 | 3.7 | 79 |
| 14 | 7 | 34 | 0.043 | 3.6 | 80 |
| 15 | 6 | 35 | 0.047 | 4.0 | 81 |
| 16 | 5 | 36 | 0.047 | 4.0 | 82 |
| 17 | 4 | 37 | 0.041 | 3.5 | 82 |
| 18 | 0 | 40 | 0.045 | 3.7 | 83 |

This demonstrates the greater effectiveness of potassium hydroxide over sodium hydroxide as well as the diluting effect of sodium hydroxide on the resultant flame spread rating.

EXAMPLE IV

Particle board samples were treated by a dipping process with an aqueous solution containing KOH and $Na_2S_2O_3$. Drying, conditioning, testing and amount of total chemical retained was determined as in EXAMPLE II.

| Sample | Solution Composition % KOH | % $Na_2S_2O_3$ | Chemical Retention lb/sq.ft/side | % board | FSR |
|---|---|---|---|---|---|
| 1 | 0 | 0 | 0 | 0 | >140 |
| 2 | 42 | 0 | 0.084 | 7.7 | 14 |
| 3 | 36 | 6 | 0.083 | 7.6 | 21 |
| 4 | 34 | 8 | 0.081 | 7.4 | 25 |
| 5 | 32 | 11 | 0.094 | 10.9 | 30 |
| 6 | 29 | 14 | 0.114 | 8.7 | 48 |
| 7 | 22 | 22 | 0.095 | 8.9 | 107 |
| 8 | 15 | 29 | 0.086 | 7.7 | 124 |
| 9 | 9 | 36 | 0.078 | 7.0 | 129 |
| 10 | 0 | 45 | 0.037 | 3.4 | >140 |

This demonstrates the effect of potassium hydroxide alone, and how the FSR increases as the amount of sodium thiosulfate was increased, the lower the FSR number the better the fire retardant effect.

EXAMPLE V

Particle board samples were treated by dipping process with an aqueous solution containing KOH and KCl. Drying, conditioning, testing and amount of total chemical retained was determined as in Example II.

| Sample | Solution Composition % KOH | % KCl | Chemical Retention lb./sq.ft/side | % of board | FSR |
|---|---|---|---|---|---|
| 1 | 0 | 0 | 0 | 0 | >140 |
| 2 | 26 | 10 | 0.078 | 10.0 | 12 |
| 3 | 26 | 10 | 0.050 | 6.0 | 20 |
| 4 | 31 | 0 | 0.053 | 4.5 | 26 |
| 5 | 27 | 5 | 0.058 | 4.9 | 35 |
| 6 | 25 | 6 | 0.056 | 4.8 | 38 |
| 7 | 23 | 8 | 0.063 | 5.3 | 42 |
| 8 | 21 | 10 | 0.057 | 4.8 | 52 |
| 9 | 16 | 16 | 0.048 | 4.0 | 94 |
| 10 | 11 | 21 | 0.054 | 4.1 | 119 |
| 11 | 6 | 26 | 0.059 | 5.0 | 134 |
| 12 | 0 | 32 | 0.027 | 2.2 | <140 |

This demonstrates how the addition of potassium chloride in increasing amounts increases the FSR.

EXAMPLE VI

Particle board samples were treated by a dipping process with an aqueous solution containing KOH and NaCl. Drying, conditioning, testing and amount of total chemical retained was determined as in Example II.

| Sample | Solution Composition % KOH | % NaCl | Chemical Retention lb/sq.ft/side | % of board | FSR |
|---|---|---|---|---|---|
| 1 | 0 | 0 | 0 | 0 | >140 |
| 2 | 26 | 10 | 0.060 | 7.7 | 36 |
| 3 | 26 | 10 | 0.052 | 6.2 | 66 |
| 4 | 27 | 0 | 0.046 | 3.9 | 52 |
| 5 | 24 | 4 | 0.053 | 4.5 | 61 |
| 6 | 22 | 5 | 0.054 | 4.6 | 71 |
| 7 | 21 | 7 | 0.051 | 4.4 | 85 |
| 8 | 18 | 9 | 0.046 | 4.0 | 114 |
| 9 | 14 | 14 | 0.047 | 3.9 | 133 |
| 10 | 9 | 18 | 0.046 | 3.9 | >140 |
| 11 | 6 | 22 | 0.045 | 3.9 | <140 |
| 12 | 0 | 27 | 0.018 | 1.5 | >140 |

This demonstrates the increase of the FSR as the amount of sodium chloride was increased.

EXAMPLE VII

Particle board samples were treated by a dipping process with an aqueous solution containing NaOH and KCl. Drying, conditioning, testing and amount of total chemical retained was determined as in Example II.

| Sample | Solution Composition | | Chemical Retention | | FSR |
|---|---|---|---|---|---|
| | % NaOH | % KCl | lb/sq.ft/side | % of board | |
| 1 | 0 | 0 | 0 | 0 | >140 |
| 2 | 31 | 0 | 0.034 | 2.9 | 85 |
| 3 | 27 | 4 | 0.043 | 3.6 | 67 |
| 4 | 25 | 6 | 0.043 | 3.5 | 65 |
| 5 | 24 | 8 | 0.044 | 3.7 | 64 |
| 6 | 21 | 11 | 0.044 | 3.7 | 66 |
| 7 | 16 | 16 | 0.047 | 3.9 | 85 |
| 8 | 10 | 21 | 0.041 | 3.4 | 124 |
| 9 | 6 | 26 | 0.045 | 3.8 | 132 |
| 10 | 0 | 34 | 0.021 | 1.8 | >140 |

The Example show that a combination of sodium hydroxide and potassium chloride improves the FSR, but that either of these alone is not very beneficial.

EXAMPLE VIII

Particle board samples were treated by a dipping process with an aqueous solution containing KOH and $Na_2CO_3$. Drying, conditioning, testing and amount of total chemical retained was determined as in Example II.

| Sample | Solution Composition | | Chemical Retention | | FSR |
|---|---|---|---|---|---|
| | % KOH | % $Na_2CO_3$ | lb/sq.ft/side | % of board | |
| 1 | 0 | 0 | 0 | 0 | >140 |
| 2 | 29 | 0 | 0.044 | | 68 |
| 3 | 24 | 4 | 0.039 | 3.1 | 73 |
| 4 | 23 | 5 | 0.037 | 2.9 | 77 |
| 5 | 22 | 7 | 0.044 | 3.5 | 81 |
| 6 | 19 | 10 | 0.040 | 3.3 | 89 |
| 7 | 14 | 14 | 0.037 | 3.0 | 110 |
| 8 | 10 | 19 | 0.043 | 3.7 | 127 |
| 9 | 6 | 23 | 0.033 | 2.6 | 131 |
| 10 | 0 | 29 | 0.041 | 3.4 | 133 |

The effect of the potassium hydroxide was reduced as the amount of sodium carbonate was increased.

EXAMPLE IX

Particle board samples were treated by a dipping process with an aqueous solution containing KOH and $K_3PO_4$. Drying, conditioning, testing and amount of total chemical retained was determined as in Example II.

| Sample | Solution Composition | | Chemical Retention | | FSR |
|---|---|---|---|---|---|
| | % KOH | % $K_3PO_4$ | lb/sq.ft/side | % of board | |
| 1 | 0 | 0 | 0 | 0 | >140 |
| 2 | 30 | 12 | 0.177 | 16.8 | 53 |
| 3 | 30 | 12 | 0.083 | 7.8 | 84 |
| 4 | 30 | 12 | 0.054 | 5.1 | 92 |
| 5 | 30 | 12 | 0.022 | 2.0 | 92 |

EXAMPLE X

Particle board samples were treated by a dipping process with an aqueous solution containing KOH and $KHCO_3$. Drying, conditioning, testing and amount of total chemical retained was determined as in Example II.

| Sample | Solution Composition | | Chemical Retention | | FSR |
|---|---|---|---|---|---|
| | % KOH | % $KHCO_3$ | lb/sq.ft/side | % of board | |
| 1 | 0 | 0 | 0 | 0 | >140 |
| 2 | 30 | 12 | 1.069 | 10.3 | 20 |
| 3 | 30 | 12 | 0.085 | 8.2 | 28 |
| 4 | 30 | 12 | 0.084 | 8.2 | 36 |
| 5 | 30 | 12 | 0.031 | 2.9 | 68 |

EXAMPLE XI

Particle board samples were treated by a dipping process with an aqueous solution containing KOH and $Na_2S$. Drying, conditioning, testing and amount of total chemical retained was determined as in Example II.

| Sample | Solution Composition | | Chemical Retention | | FSR |
|---|---|---|---|---|---|
| | % KOH | % $Na_2S$ | lb/sq.ft/side | % of board | |
| 1 | 0 | 0 | 0 | 0 | >140 |
| 2 | 30 | 12 | 0.078 | 7.5 | 26 |
| 3 | 30 | 12 | 0.072 | 6.9 | 28 |
| 4 | 30 | 12 | 0.043 | 3.8 | 53 |
| 5 | 30 | 12 | 0.014 | 1.3 | 68 |

EXAMPLE XII

Particle board samples were treated by a dipping process with an aqueous solution containing KOH and $Na_2SO_3$. Drying, conditioning, testing and amount of total chemical retained was determined as in Example II.

| Sample | Solution Composition | | Chemical Retention | | FSR |
|---|---|---|---|---|---|
| | % KOH | % $Na_2SO_3$ | lb/sq.ft/side | % of board | |
| 1 | 0 | 0 | 0 | 0 | >140 |
| 2 | 15 | 6 | 0.107 | 10.2 | 68 |
| 3 | 15 | 6 | 0.083 | 8.0 | 76 |

EXAMPLE XIII

Particle board samples were treated by a dipping process with an aqueous solution containing KOH and $NaHSO_3$. Drying, conditioning, testing and amount of total chemical retained was determined as in Example II.

| Sample | Solution Composition | | Chemical Retention | | FSR |
|---|---|---|---|---|---|
| | % KOH | % $NaHSO_3$ | lb/sq.ft/side | % of board | |
| 1 | 0 | 0 | 0 | 0 | >140 |
| 2 | 15 | 6 | 0.088 | 8.6 | 60 |
| 3 | 15 | 6 | 0.080 | 7.9 | 68 |
| 4 | 15 | 6 | 0.066 | 6.3 | 76 |

EXAMPLE XIV

Particle board samples were treated by a dipping process with an aqueous solution containing KOH and $NaNO_2$. Drying, conditioning, testing and amount of total chemical retained was determined as in Example II.

| Sample | Solution Composition | | Chemical Retention | | FSR |
|---|---|---|---|---|---|
| | % KOH | % NaNO$_2$ | lb/sq.ft/side | % of board | |
| 1 | 0 | 0 | 0 | 0 | >140 |
| 2 | 30 | 12 | 0.050 | 4.8 | 36 |
| 3 | 30 | 12 | 0.035 | 3.6 | 50 |
| 4 | 30 | 12 | 0.025 | 2.2 | 76 |

EXAMPLE XV

Particle board samples were treated by a dipping process with an aqueous solution containing KOH and NaPO$_3$. Drying, conditioning, testing and amount of total chemical retained was determined as in Example II.

| Sample | Solution Composition | | Chemical Retention | | FSR |
|---|---|---|---|---|---|
| | % KOH | % NaPO$_3$ | lb/sq.ft/side | % of board | |
| 1 | 0 | 0 | 0 | 0 | >140 |
| 2 | 30 | 12 | 0.045 | 4.1 | 26 |
| 3 | 30 | 12 | 0.017 | 1.5 | 37 |

EXAMPLE XVI

Particle board samples were treated by a dipping process with an aqueous solution containing KOH and CH$_3$COOK. Drying, conditioning, testing and amount of total chemical retained was determined as in Example II.

| Sample | Solution Composition | | Chemical Retention | | FSR |
|---|---|---|---|---|---|
| | % KOH | % CH$_3$COOK | lb/sq.ft/side | % of board | |
| 1 | 0 | 0 | 0 | 0 | >140 |
| 2 | 30 | 12 | 0.101 | 9.6 | 12 |
| 3 | 30 | 12 | 0.049 | 4.5 | 12 |
| 4 | 30 | 12 | 0.025 | 2.3 | 15 |

EXAMPLE XVII

Particle board samples were treated by a dipping process with an aqueous solution containing KOH and K$_3$C$_6$H$_5$O$_7$.H$_2$O. Drying, conditioning, testing and amount of total chemical retained was determined as in Example II.

| Sample | Solution Composition | | Chemical Retention | | FSR |
|---|---|---|---|---|---|
| | % KOH | % K$_3$C$_6$H$_5$O$_7$.H$_2$O | lb/sq.ft/side | % of board | |
| 1 | 0 | 0 | 0 | 0 | >140 |
| 2 | 30 | 12 | 0.085 | 8.7 | 20 |
| 3 | 30 | 12 | 0.021 | 1.9 | 60 |

EXAMPLE XVIII

Particle board samples were treated by a dipping process with an aqueous solution containing KOH and K$_2$S$_2$O$_3$. Drying, conditioning, testing and amount of total chemical retained was determined as in Example II.

| Sample | Solution Composition | | Chemical Retention | | FSR |
|---|---|---|---|---|---|
| | % KOH | % K$_2$S$_2$O$_3$ | lb/sq.ft/side | % of board | |
| 1 | 0 | 0 | 0 | 0 | >140 |
| 2 | 30 | 12 | 0.110 | 10.4 | 34 |
| 3 | 30 | 12 | 0.105 | 9.8 | 36 |
| 4 | 30 | 12 | 0.017 | 1.5 | 42 |

EXAMPLE XIX

Particle board samples were treated by a dipping process with an aqueous solution containing LiOH. Drying, conditioning, testing and amount of total chemical retained was determined as in Example II.

| Sample | Solution Composition | Chemical Retention | | FSR |
|---|---|---|---|---|
| | % LiOH | lb/sq.ft/side | % of board | |
| 1 | 0 | 0 | 0 | 140 |
| 2 | 19 | 0.036 | 3.0 | 124 |
| 3 | 19 | 0.028 | 2.6 | 116 |

The invention as claimed provides sufficient flame resistance by intumescence of the cellulosic material when it is subjected to heat or flame. However, several developments based on this invention are available by the use of several concepts and presently accepted principles which are noted in the literature and the most effective of which are outlined as follows.

1. The synergistic action of antimony and halogen in flame retardation is well documented "Flame Retardant Paints", Anon, *Paint Manufacture*, April 1964, 47–49; and J. J. Pits, P. H. Scott, and D. G. Powell, "Thermal Decomposition of Antimony Oxychloride and Mode in Flame Retardance", *Journal of Cellular Plastics*, Jan./Feb., 1970, 35–37). By use of antimony and halogen compounds with a preferred antimony to halogen ration of 1:3 to a content of up to 5% of the above specified treatment solution the effects of the fire retardant treatment are improved. As suggested in the literature this is due to the formation of noncombustible compounds of antimony and halogen at approximately the temperature of cellulose decomposition. In the present invention the antimony-halogen synergism thus provide noncombustible inorganic vapors which are trapped in the intumescing cellulosic char layer on the surface of the substrate when this substrate is subjected to heat or flame.

2. It is known that cellulose xanthate is subjected to major thermal decompositions at a temperature somewhat lower than cellulose (R. G. Zhbankov, "Infrared Spectra of Cellulose and Its Derivatives", 1964 Translated From Russian 1966, references cited therein). Therefore, by addition of up to 5% carbon disulfide or an alkali metal thiocarbonate, preferably potassium thiocarbonate, to the treatment solutions of this invention there is formed on addition of this alkali system to a cellulose or wood based material a low percentage of alkali metal cellulose xanthate. This, when subjected to heat or flame, further lowers the thermal flow point of the treated substrate and thus increases the effectiveness of the intumescent carboniferous char.

We claim:

1. A flame-proof product comprising a cellulosic or wood base substrate having at its surface at least one fire retardant chemical compound selected from the group consisting of potassium hydroxide and potassium carbonate, said compound being provided at said surface in an amount of at least 75% by weight based on the total weight of fire retardant chemicals applied to said surface by drying a solution of said compound applied thereto, the amount of said compound at said surface being sufficient such that when said surface is subjected to high temperatures, said surfaces foams with decomposing cellulosic material to form a layer of relatively noncombustible intumescent carboniferous char.

2. A flame-proof product as claimed in claim 1 in which said surface further includes up to 25% by weight of the total fire retardant chemicals applied to the surface of at least one fire retardant chemical selected from the group consisting of potassium acetate, potassium bicarbonate, potassium bisulfite, potassium chloride, potassium citrate, potassium metaphosphate, potassium nitrite, potassium sulfide, potassium sulfite, tripotassium phosphate, and potassium thiosulfate.

3. A flame-proof product as claimed in claim 1 in which said surface further includes up to 25% by weight of the total fire retardant chemicals applied to the surface of at least one chemical selected from the group consisting of sodium carbonate, sodium hydroxide, sodium acetate, sodium bicarbonate, sodium bisulfite, sodium chloride, sodium citrate, sodium metaphosphate, sodium nitrite, sodium sulfide, sodium sulfite, trisodium phosphate, and sodium thiosulfate.

* * * * *